April 17, 1962  B. KRIZNIC  3,029,882
ANALYTICAL BALANCE
Filed July 19, 1961

Inventor
Bojan Kriznic,
by
Pierce, Scheffler & Parker
his Attorneys

United States Patent Office 3,029,882
Patented Apr. 17, 1962

3,029,882
ANALYTICAL BALANCE
Bojan Kriznic, Kusnacht, Zurich, Switzerland, assignor to Erhard Mettler, Zollikon, Zurich, Switzerland
Filed July 19, 1961, Ser. No. 125,220
Claims priority, application Switzerland Nov. 18, 1960
8 Claims. (Cl. 177—150)

This invention relates to an analytical balance comprising an asymmetrical balance beam and means for arresting the balance by lifting the centre knife-edge of the balance beam off of the fulcrum and by lifting the suspension means carrying the scale pan off of the end knife-edge of the balance beam.

Objects of the invention are to provide a balance of the type stated having an arresting device including lifting means which engage the balance beam from below adjacent its centre knife-edge for raising said centre knife-edge off of the fulcrum, a retaining element engaging the balance beam from above adjacent its end knife-edge, and means for raising the suspension means carrying the scale pan off of the end knife-edge of said balance beam. A further object of the invention is an arresting device for an analytical balance of the type stated, said arresting device including a first vertically movable member having a pair of upwardly directed arresting pins by means of which in the raised position of said member the balance beam is supported adjacent its centre knife-edge in order to lift its centre knife-edge off of the fulcrum, a second vertically movable member having a downwardly directed retaining element by means of which in the lowered position of said second member the respective arm of the balance beam is held down adjacent its end knife-edge, and an actuating mechanism for the displacement of both said movable members in opposed directions in such a way that, when said arresting device is moved from the arrested position into the release position, said first member is moved downwards and said second member is moved upwards.

Figure 1:
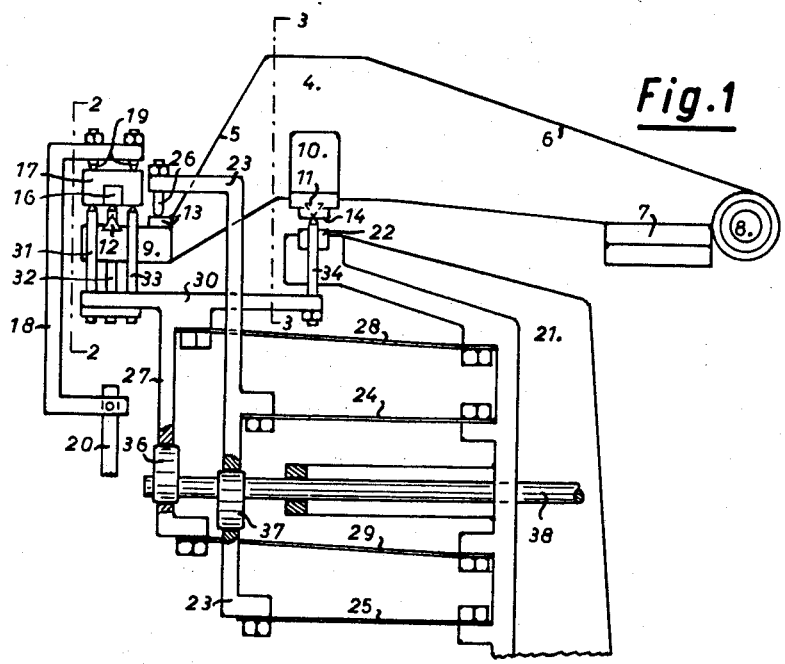
Figure 2:
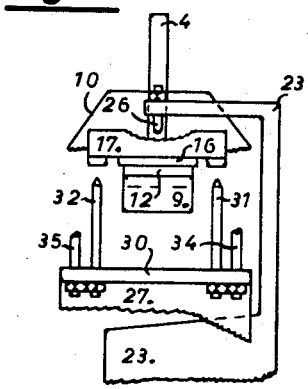
Figure 3:
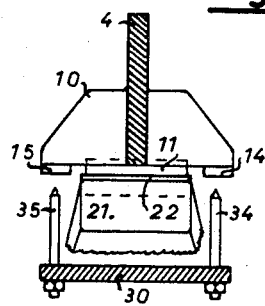

These and other objects and the advantages of the invention will best be understood from the following description of a specific embodiment when read in connection with the accompanying drawing in which:

FIG. 1 shows a side view of the relevant parts of an analytical balance provided with an arresting device being in the arrested position, FIG. 2 shows a front view of the arresting device and of the shorter balance beam arm at the place marked 2—2 in FIG. 1, and FIG. 3 shows a section through the arresting device and through the balance beam at the place marked 3—3 in FIG. 1.

Unlike FIG. 1, FIGS. 2 and 3 show the release position of the arresting device and in them only the upper relevant parts or the arresting device are shown.

The main feature of the asymmetrical balance beam is a plate-shaped part 4 arranged on edge and forming the two balance arms 5 and 6. The longer arm 6 is provided with a counterweight 7 and a graduated dial 8, the latter being used to read the inclination of the balance beam when weighing. Two rigid knife-edge supports 9 and 10 are attached to and project laterally from the plate-shaped part 4 of the balance beam, the centre knife-edge 11 (FIG. 3) projecting from the bottom of the support 10 and the end knife-edge 12 (FIG. 2) from the top of the support 9. The knife-edge support 9 also has a bearing 13, which is provided on the shorter arm 5, near the middle of the end knife-edge 12 and offset slightly towards the centre knife-edge 11. The upper surface of this bearing should be at least approximately on the level of the edge of the end knife-edge 12. Correspondingly, the support 10 has two bearings 14 and 15 (FIG. 3), each of which is connected to one end of the centre knife-edge 11 and extending, at least approximately, on the level of the edge of the centre knife-edge 11.

The suspension means attachable to the end knife-edge 12 has a plate-shaped thrust plate 16 projecting from the bottom of an intermediate member 17, as shown in FIG. 2. At the top of the intermediate member 17, in known manner, a connecting yoke 18 is hinged by means of conical pins 19 about an axis running transversely to the longitudinal direction of the end knife-edge 12. For the sake of clarity the connecting yoke 18 is not shown in FIG. 2. At the lower end of the connecting yoke 18, finally, is hinged the equally conventional carrying rod 20, from which hang both the scale pan and the control weights. The scale pan, the control weights and the other related suspension means on the carrying rod 20 are not shown in the drawing, and only a part of the rod 20 is represented.

The only part of the balance rack shown is the stationary column 21, having at its upper offset end the fulcrum 22, on which the centre knife-edge 11 of the beam 4 to 6 rests when the arresting device is in the release position, as shown in FIG. 3.

The arresting device has a member 23, which is guided for parallel motion and is vertically movable with the aid of two flat springs 24 and 25 attached to the column 21. The upper end of the member 23 projects above the shorter balance beam arm 5 (FIGS. 1 and 2) and is provided with a downwardly directed retaining pin 26. In the arrested position, this retaining pin 26 holds down from above the bearing 13 set in the shorter balance beam arm 5, giving the position shown in FIG. 1. The arresting device has a further member 27, which can also be guided for parallel motion and moved in a vertical direction by means of two flat springs 28 and 29 attached to the column 21. This member 27 has a plate-shaped crown-piece 30, extending below the balance beam 4 to 6. On the crown-piece 30 are fixed three lifting pins 31, 32 and 33, projecting upwards and tapering at the top, which in the arrested position engage in guideways provided on the lower surface of the intermediate member 17 and lift said intermediate member 17—and therewith also the entire suspension 16 to 20—from the end knife-edge 12 of the balance beam. The crown-piece has also two further lifting pins 34 and 35, projecting upwards and tapering at the top. These are arranged so as to correspond with the bearings 14 and 15 and to engage from below in guideways of these bearings. For the sake of clarity, the guideways provided in the bearings 14 and 15 and in the intermediate member 17 are not shown in the drawing. In the arrested position (FIG. 1) the balance beam 4 to 6 is accordingly raised, by means of the two lifting pins 34 and 35 on either side of its centre knife-edge 11, enough to allow the centre knife-edge 11 to be lifted off of the fulcrum 22. No other lifting means are provided for the balance beam 4 to 6. As the longer arm 6 in particular is nowhere supported, the counterweight 7 has a tendency to turn the balance beam clockwise about the tops of the lifting pins 34 and 35. This rotation is, however, prevented by the retaining pin 26, which depresses the shorter arm 5 far enough to make the end knife-edge 12 move away from the thrust plate 16, as shown in FIG. 1.

In order to pass the arresting device from the arrested position according to FIG. 1 to the release position, the member 23 provided with the retaining pin 26 is moved upwards and the member 27 having the lifting pins 31 to 35 simultaneously moved downwards. To achieve this contrary movement of the two members 23 and 27 an actuating mechanism is provided which comprises two cam discs 36 and 37 for raising or lowering the members 23 and 27 respectively. The cam discs act as eccentrics and are mounted offset on a common shaft 38 which is rotatably mounted in the column 21. At the end of the shaft 38 projecting from the balance housing and not illustrated the conventional control knob is provided, by means of which the arresting mechanism can be actuated by hand. In the release position of the arresting device the centre knife-edge 11 is seated on the fulcrum 22, so that the balance beam can pivot about the edge of the centre knife-edge 11. The member 27 thereby assumes its lowest position, so that the lifting pins 34 and 35 are downwardly withdrawn according to FIG. 3. At the same time, however, the lifting pins 31 to 33 are also downwardly withdrawn, so that, as shown in FIG. 2, the thrust plate 16 of the suspension means 16 to 20 is seated on the end knife-edge 12 of the balance beam. In order that the retaining pin 26 shall not impede the movement of the beam 4 to 6, the member 23 must assume its highest position when the arresting device is in the release position, so that the retaining pin 26 is then upwardly withdrawn.

In order to arrest the balance, i.e. to pass from the release position to the arrested position, the shaft 38 is turned half a revolution. The member 27 is thereby raised and the member 23 simultaneously lowered. As a result of the raising of the lifting pins 34 and 35 the latter come into contact with the bearings 14 and 15 of the balance beam 4 to 6 and at the same time the lifting pins 31 to 33 rise to engage the intermediate member 17. By the action of the counterweight 7 the balance beam will start to rotate slightly clockwise about the lifting pins 34 and 35. This rotation of the balance beam is however restricted through the subsidence of the other member 23 and by means of the retaining pin 26, and the retaining pin 26 will finally depress the shorter balance arm 5, so that the thrust plate 16 becomes lifted off of the end knife-edge 12. The arrested position of the balance beam 4 to 6 and of the suspension means 16 to 20, illustrated in FIG. 1, is thus obtained.

In the arrested position shown in FIG. 1 the longer arm 6 of the balance beam is obviously loaded by the counterweight 7 exactly the same as in the released position. But the shorter balance beam arm 5 is also subjected to virtually the same stress in the arrested position as in the released position. Through the action of the counterweight 7 on the one hand and of the retaining pin 26 on the other, both beam arms 5 and 6 are subjected to bending stress, the amount of which being virtually the same as in the released position of the arresting device. Thus no hysteresis effects or elastic after-effects can arise when the arresting device is actuated, and consequently the fluctuations of the zero position of the balance beam which would result from such effects are avoided. It is therefore possible to commence accurate weighing immediately after the arresting device has been operated, the latter moved in the release position.

A somewhat simpler embodiment of the invention could consist in having the retaining pin 26 not mounted on a movable member but stationary. In that case, however, the remaining member 27, fitted with the lifting pins 31 to 35, would have to perform a considerably larger stroke when the arresting device is actuated, in order to accomplish the desired lifting of the suspension means 16 to 20 and of the balance beam 4 to 6 on the one hand, and to give the balance beam 4 to 6 the required freedom of movement about its centre knife-edge 11 when the arresting device is in its released position on the other hand.

It would also be possible to mount the lifting pins 31 to 33, which are provided for the suspension means 16 to 20, not on the member 27 but on a special member, moved similarly to the member 27 but with a different stroke. The retaining pin 26 could then be seated on a third, oppositely-moving member 23 or else mounted stationary. These and similar adaptions of the arresting device which may occur to those familiar with the art fall within the scope of the invention as set forth in the following claims.

I claim:
1. An analytical balance comprising an asymmetrical balance beam having a counterweight on one of its arms, a centre knife-edge, and an end knife-edge on the other of its arms; a balance rack having a fulcrum for pivotally supporting said centre knife-edge of the balance beam, suspension means pivotally supported on said end knife-edge in the release position of the balance, and an arresting device including lifting means engaging said balance beam from below adjacent its centre knife-edge for raising said centre knife-edge off of said fulcrum, a retaining element engaging said balance beam from above adjacent its end knife-edge, and lifting means for raising said suspension means off of said end knife-edge.

2. The invention as recited in claim 1, wherein in the arrested position of said arresting device said beam lifting means holds the balance beam at either side of the ends of its centre knife edge.

3. The invention as recited in claim 1, wherein in the arrested position of said arresting device said retaining element engages from above said balance beam at a point adjacent to the middle of its end knife-edge.

4. The invention as recited in claim 1, wherein in the arrested position of said arresting device said beam lifting means engages said balance beam from below at least approximately on the level of its centre knife-edge.

5. The invention as recited in claim 1, wherein in the arrested position of said arresting device said retaining element engages said balance beam from above at least approximately on the level of its end knife-edge.

6. An analytical balance comprising an asymmetrical balance beam having a centre knife-edge, a counterweight on its longer arm, and a end knife-edge on its shorter arm; a balance rack having a fulcrum for pivotally supporting said centre knife-edge of the balance beam, suspension means pivotally supported from said end knife-edge of the balance beam in the release position of the balance, and an arresting device including a first vertically movable member, a pair of upwardly directed arresting pins mounted on said first movable member, in the raised position of which said pins support said balance beam from below adjacent its centre knife-edge in order to lift off its centre knife-edge from said fulcrum, a second vertically movable member having a downwardly directed retaining pin, in the lowered position of which said retaining pin engages said balance beam from above adjacent its end knife-edge, and an actuating mechanism for the displacement of both said movable members in opposed directions in such a way that, when said arresting device passes from the arrested position into the release position, said pair of arresting pins are moved downwards and said retaining pin upwards.

7. The invention as recited in claim 6, wherein on said first movable member provided with said pair of beam lifting means, there are also provided three upwardly directed suspension lifting pins which, in the raised position of said first movable member, lift off said suspension means from said end knife-edge of the balance beam.

8. The invention as recited in claim 6, wherein said actuating mechanism includes a shaft rotatably mounted in said balance rack and a pair of eccentrics mounted offset on said shaft, said eccentrics acting on said two movable members in opposed directions.

No references cited.